US006825833B2

(12) United States Patent
Mulligan et al.

(10) Patent No.: US 6,825,833 B2
(45) Date of Patent: Nov. 30, 2004

(54) SYSTEM AND METHOD FOR LOCATING A TOUCH ON A CAPACITIVE TOUCH SCREEN

(75) Inventors: Roger C. Mulligan, White Rock (CA); Massoud Badaye, Vancouver (CA); Brian G. W. Lim, Vancouver (CA)

(73) Assignee: 3M Innovative Properties Company, St. Paul, MN (US)

( * ) Notice: Subject to any disclaimer, the term of this patent is extended or adjusted under 35 U.S.C. 154(b) by 221 days.

(21) Appl. No.: 09/998,614

(22) Filed: Nov. 30, 2001

(65) Prior Publication Data

US 2003/0103043 A1 Jun. 5, 2003

(51) Int. Cl.$^7$ ............................................. G06K 11/16
(52) U.S. Cl. ................................. 345/174; 178/18.06
(58) Field of Search ............................... 345/174, 173, 345/156, 179, 178; 178/19.04, 18.01, 20, 18.06, 18.03, 19.01, 19.03, 20.01

(56) References Cited

U.S. PATENT DOCUMENTS

| | | | |
|---|---|---|---|
| 4,659,874 A | | 4/1987 | Landmeier |
| 4,806,709 A | * | 2/1989 | Evans ...................... 178/18.06 |
| 5,015,072 A | | 5/1991 | Howell |
| 5,650,597 A | * | 7/1997 | Redmayne ............... 178/18.06 |
| 5,844,506 A | * | 12/1998 | Binstead ...................... 341/34 |
| 5,861,583 A | * | 1/1999 | Schediwy et al. ........ 178/18.06 |
| 5,933,102 A | * | 8/1999 | Miller et al. .................... 341/33 |
| 6,297,811 B1 | * | 10/2001 | Kent et al. ................... 345/173 |
| 6,492,979 B1 | * | 12/2002 | Kent et al. ................... 345/173 |
| 2003/0067447 A1 | * | 4/2003 | Geaghan et al. ............ 345/173 |

FOREIGN PATENT DOCUMENTS

| | | |
|---|---|---|
| EP | 0 495 199 A2 A3 | 7/1992 |
| EP | 0 917 291 A2 | 5/1999 |
| JP | 3-11514 | 1/1991 |
| JP | 5-127822 | 5/1993 |
| JP | 9-185328 | 7/1997 |
| JP | 10-69355 | 3/1998 |
| JP | 10-161109 | 6/1998 |
| JP | 10-301099 | 11/1998 |
| JP | 11-53118 | 2/1999 |
| JP | 11-142836 | 5/1999 |
| WO | WO 99/53432 | 10/1999 |

* cited by examiner

*Primary Examiner*—Bipin Shalwala
*Assistant Examiner*—Nitin Patel
(74) *Attorney, Agent, or Firm*—Robert J. Pechman (57) ABSTRACT

Described is a touch-sensitive screen having a sensing circuit capable of discriminating where a perturbation of an electric field created by the sensing circuit occurs. The invention may be implemented in a capacitive touch sensor in which each of multiple conductive sensor bars is connected to a conductive lead line. There are fewer lead lines than sensor bars. Thus, at least one and likely several lead lines are connected to more than one sensor bar. The particular connections of lead lines to sensor bars are selected to avoid ambiguity created by a given signal being possibly generated on more than a single conductive bar. More specifically, the invention provides a technique for laying out lead line to sensor bar connections to enable distinguishing which sensor bar, having common lead lines with other sensor bars, has experienced or is closest to a touch on the sensor.

17 Claims, 7 Drawing Sheets

SYSTEM AND METHOD FOR LOCATING A TOUCH ON A CAPACITIVE TOUCH SCREEN

BACKGROUND OF THE INVENTION

1. Field of Invention

The present invention relates to touch sensitive screens or sensors. More particularly, the present invention relates to a capacitive touch screen that provides a control signal indicative of where the screen or sensor was touched by a fingertip or utensil.

2. Description of the Related Art

Touch screens are becoming more prevalent as data input interfaces as computers and other electronic devices become more ubiquitous. For example, touch screens may now be found in workshops, warehouses, manufacturing facilities, restaurants, on hand-held personal digital assistants, automatic teller machines, casino game-machines, and the like.

One type of touch screen, a capacitive touch screen, includes a capacitive sensing circuit with multiple sensor bars that each produce an electric field. Often, but not necessarily, the sensing circuit is laminated with an optically transparent protective substance, such as a glass pane. A touch in proximity to one or more of the sensor bars modulates the electric field and creates a signal. The signal is passed from the sensor bars to a controller using a network of lead lines that electrically connect the sensing circuit to the controller. The controller resolves the signal or signals to determine the location of the touch on the screen. The coordinates of the location may then be communicated to another processor for further processing, such as to a computer for entering an order of an item displayed and touched on the screen.

Touch screen designers are constantly faced with problems when designing touch screens and, more specifically, sensing circuits. The designers are constantly seeking an acceptable trade off between the number of sensor bars that are required to provide adequate resolution in the "Y" direction, and the number of lead lines that are necessary to connect those sensor bars to the controller.

One existing solution to the problem is through the use of an asymmetrically addressed sensor circuit layout. In such systems, the lead lines on the edges of the screen are each connected to several sensor bars so that there can be many more sensor bars than lead lines. The connections of the lead lines to sensor bars is periodic in that every nth bar is connected to the same line. The repeating period is different on one side of the screen from the other (thus the asymmetric label) so that each sensor bar in the screen has a different right-side/left-side lead line connection combination than any other sensor bar on the screen. This unique addressing combination allows the control system to uniquely determine the sensor bar being touched.

SUMMARY OF THE INVENTION

The invention provides a technique for designing a sensor circuit for a capacitive touch screen that allows each lead line to be connected to multiple sensor bars of the sensing circuit and corresponding lead lines on each side of the screen connect to exactly the same sensor bars. In this aspect, the sensor bar-to-lead line connections on the left and right sides of the screen are symmetric. The lead line to sensor bar connections for the sensing circuit are arranged such that a touch on any sensor bar creates a signal pattern that is uniquely distinguishable from a touch on another sensor bar connected to the same lead line.

In one aspect, the sensor array includes a series of sensor bars, with each of the bars having a first end and a second end. The first and second ends of each sensor bar are connected to lead lines that electrically connect the sensor bars to a controller. Two or more sensor bars may be connected to the same lead line. However, by carefully laying out the sensor bar to lead line connections over the entire sensing circuit, a touch on any one sensor bar creates a signal pattern over a set of sensor bars (including the touched sensor bar) that is distinguishable from any other similarly-sized set of sensor bars. Thus, a touch can be resolved to a particular set of sensor bars, and then the relative strengths of the signals on each sensor bar in the set identifies more precisely where on the touch screen the touch occurred.

In another aspect, sets of sensor bars having non-unique membership sensor bar to lead line connections may be laid out by first identifying signal magnitude patterns that are likely and highly unlikely to result from possible real world touches. If a set of sensor bars having a first combination of bar-to-line connections is used, the same bar-to-line connections may be used in a different combination, so long as the different combination is highly unlikely to produce a similar signal pattern. In other words, the same set of bar-to-line connections can be reused in different sets of sensor bars, so long as the order of the bar-to-line combinations in each of the sets cannot create the same signal magnitude pattern as a touch elsewhere on the sensing circuit.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings which are schematic and not to scale, wherein.

DETAILED DESCRIPTION OF THE PREFERRED EMBODIMENTS

This section illustrates aspects of the invention and points out certain preferred embodiments of those aspects. This section is not intended to be exhaustive, but rather to inform and teach the person of skill in the art who will come to appreciate more fully other aspects, equivalents, and possibilities presented by the invention, and hence the scope of the invention as set forth the in the claims.

The present invention enables a touch-sensitive screen having a sensing circuit that is capable of discriminating where a perturbation of an electric field created by the sensing circuit occurs. In one embodiment, the invention is implemented in a capacitive touch system, including a touch sensor in which each of multiple conductive sensor bars is connected to a conductive lead line. There are fewer lead lines than sensor bars. Thus, at least one and likely several lead lines are connected to more than one sensor bar. In accordance with the invention, the particular connections of lead lines to sensor bars are selected to avoid ambiguity created by a signal being present on a line connected to more than a single conductive bar. More specifically, the invention provides a technique for laying out lead line to sensor bar connections to enable distinguishing which sensor bar, having common lead lines with other sensor bars, has experienced or is closest to a touch on the sensor. The particulars of the technique will become apparent from the following detailed discussion of embodiments of the invention.

Figure 1:
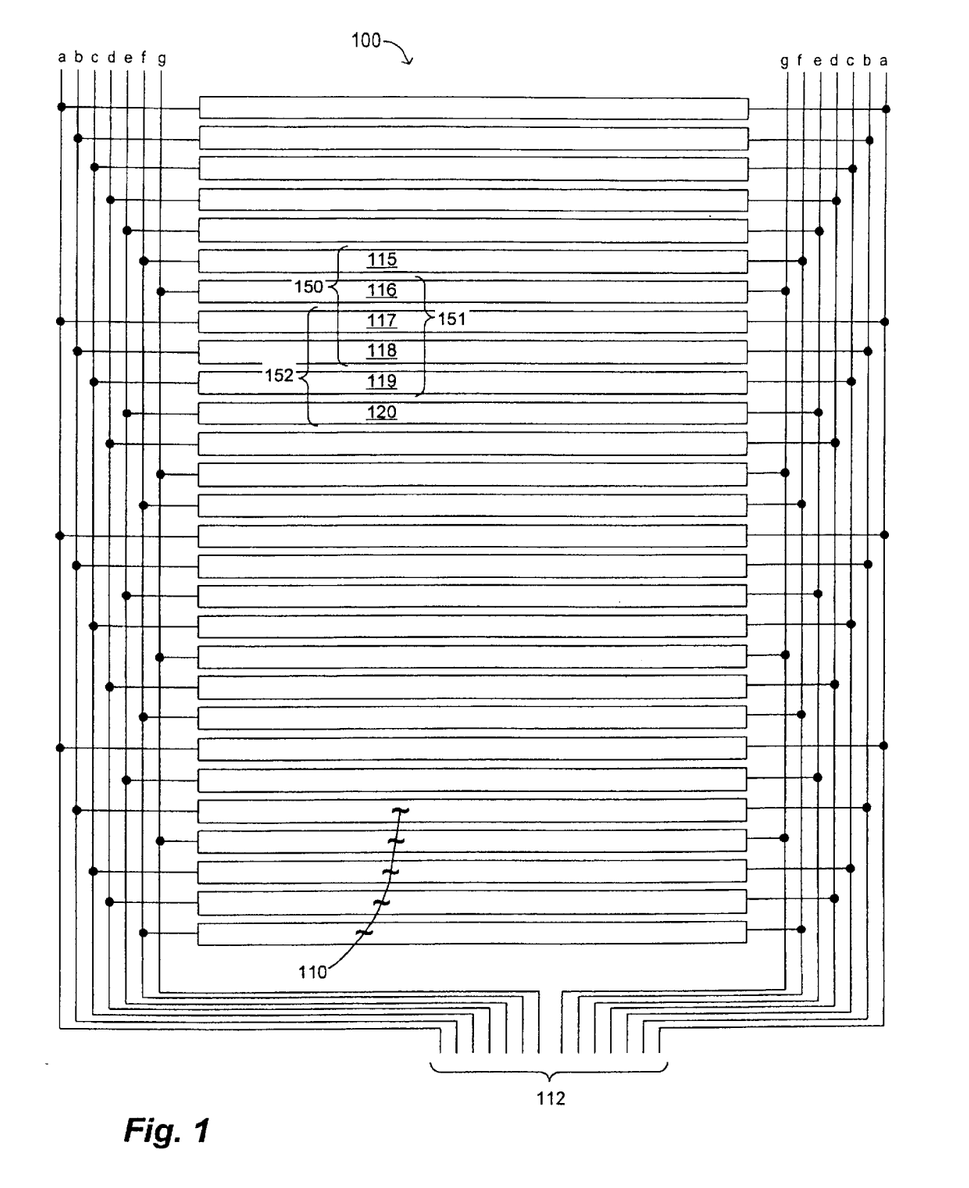
FIG. 1 is a schematic representation of one embodiment of a touch sensor circuit in accordance with the invention.

FIG. 1 is a schematic representation of one implementation of the present invention showing an exemplary symmetric sensing circuit 100 for use in a touch-sensitive screen. More specifically, the sensing circuit 100 includes several touch-sensitive sensor bars (the "bars") 110, which span from one side to the other of the sensing circuit 100. The bars 110 preferably have resistance characteristics that vary in a linear fashion over the length of the bars. They are preferably constructed of indium tin oxide (ITO) for optically-transparent applications, but may be constructed of any suitably-conductive material, whether transparent or not. Although described here in terms of a single, relatively-wide conductor that spans the touch screen, it should be appreciated that many alternative types of bars may be used without departing from the spirit and scope of the invention. For instance, conductive material such as thin wire may be used that spans from one side to the other of the touch screen and back, effectively creating a loop. This example differs from the solid bars in that the area within the loop is not conductive. Alternatively, conductive wires may be used that span the touch screen once, but make some pattern across the touch screen, such as a multi-toothed pattern. In addition, it will be appreciated that alternative bars may be used that are single ended or that are only connected to lines on one side. These and many other alternatives will become apparent, and the disclosed embodiments are merely provided as examples.

In this embodiment, each end of the bars 110 is connected to one end of a conductive lead line (the "lines") 112. The other ends of the lines 112 are connected to an electronic control circuit ("controller") (not shown), which is configured to set up an electric field on the sensor bars and to analyze a signal caused by a modulation of the electric field on the bars due to a touch. In one embodiment, the lines 112 may be gathered into a tail having one or more conductive connectors for connection to the controller. Those skilled in the art will appreciate that any means will suffice for coupling the lines to the controller. In general, the lines may be made of practically any conductive material, such as copper, silver, gold, or the like. If the lines are printed onto film, the film is desirably non-reactive with the conductive material.

The lines 112 on each side are designated alphanumerically by the letters a–g (for a total of 7) on both the left hand and right hand sides of the sensing circuit 100. For simplicity of discussion, the lines connected to each side of any particular bar have the same alphanumeric designation. In other words, for the design shown in FIG. 1, the left hand side is a mirror image of the right hand side with respect to the connections of the several bars 110 to the lines 112. For example, in the particular arrangement shown, the topmost bar is connected at its left end to the lead line designated a, and at its right end to the lead line also designated a.

For the purpose of this discussion, a "touch" is deemed to occur when an object comes in proximity to sensor bars sufficiently to cause a modulation of an electric field set up on the bars by the controller. The axis perpendicular to the bars is said to be the Y axis. The X axis is perpendicular to the Y axis, or parallel to the bars.

At this point, it is helpful to introduce and explain the "window" concept that will be used extensively throughout the following discussion. In its simplest sense, a "window" represents a set of adjacent bars 110 of set size "W." The size of the window represents the number of bars 110 that are included in the window. The window size (W) may be any arbitrary number, but could have an upper limit equal to the number of lines 112 present in the screen. For example, referring to FIG. 1, if a window size equals four, then a first window 150 may include bars 115, 116, 117, and 118. A second window 151 may include bars 116, 117, 118, and 119. Yet a third window 152 may include bars 117, 118, 119 and 20. Note that windows may overlap, and that each bar 110 belongs to at least one and as many as W distinct windows.

In accordance with the invention, every bar 110 within any window is connected to a different line 112. A "line representation" is neither a bar 110 nor a line 112, but is a tool to describe the bar-to-line connections. In other words, each bar bears a line representation, which is a line designation corresponding to the line to which the bar is connected. Thus, bars may be described with reference to their line representation, such as bar "b" for a bar connected to a line having the designator "b." Windows may then conveniently be described with reference to a set of line representations. The convention for the sake of this description is to represent windows by line representations in north to south order (top to bottom as shown in FIG. 1). For instance, referring again to FIG. 1, the bars 115–118 within the first window 150 are connected to lines f-g-a-b. Thus the first window 150 may be referred to as the fgab window or simply represented as fgab. Similarly, the second window 151 includes bars 116–119 connected to lines g-a-b-c, and may be represented as gabc. Likewise, the third window 152 includes bars 117–120 connected to lines a-b-c-e, and may be represented as abce.

For the purpose of this discussion, bars that are adjacent to one another or that share the same window are termed "neighbors." A contact to the touch-sensitive screen in the area of a bar, such as bar 118, will create a signal on at least the line connected to that bar (e.g., line b). In addition, the touch (as well as other near field or far field effects) may create signals on the lines connected to other bars adjacent to the touched bar. It should be apparent that a touch to the screen should result in a peak signal on the touched bar, and lesser or decreasing signals on the neighbors of the touched bar. Thus, any touch to the screen should result in a pattern of signals on several lines connected to bars that are near the touch.

As will become clear later, the thrust of the invention lies in the ability to resolve where on a touch-sensitive screen a touch occurred by analyzing the signals on a set of lines to identify a window of adjacent bars within which the touch occurred. It will be appreciated that the present invention differs from the asymmetric touch screen in that the lead lines on one side of the touch screen connect to the same bars as the corresponding lead lines on the other side of the touch screen. The line-to-bar connections on the left side of the screen are the mirror image of those on the right side. When there are far field influences, there will be a mostly balanced representation on the left and the right side of the screen.

FIG. 1 provides one example of a sensing circuit created in accordance with the teachings of the invention. The following examples, illustrations, and guidelines provide a complete description of a methodology for creating a sensing circuit in accordance with the invention. It should be noted that the examples, illustrations, and guidelines described herein are illustrative only and may be deviated from in certain measures without deviating from the spirit and scope of the invention.

Figure 2:
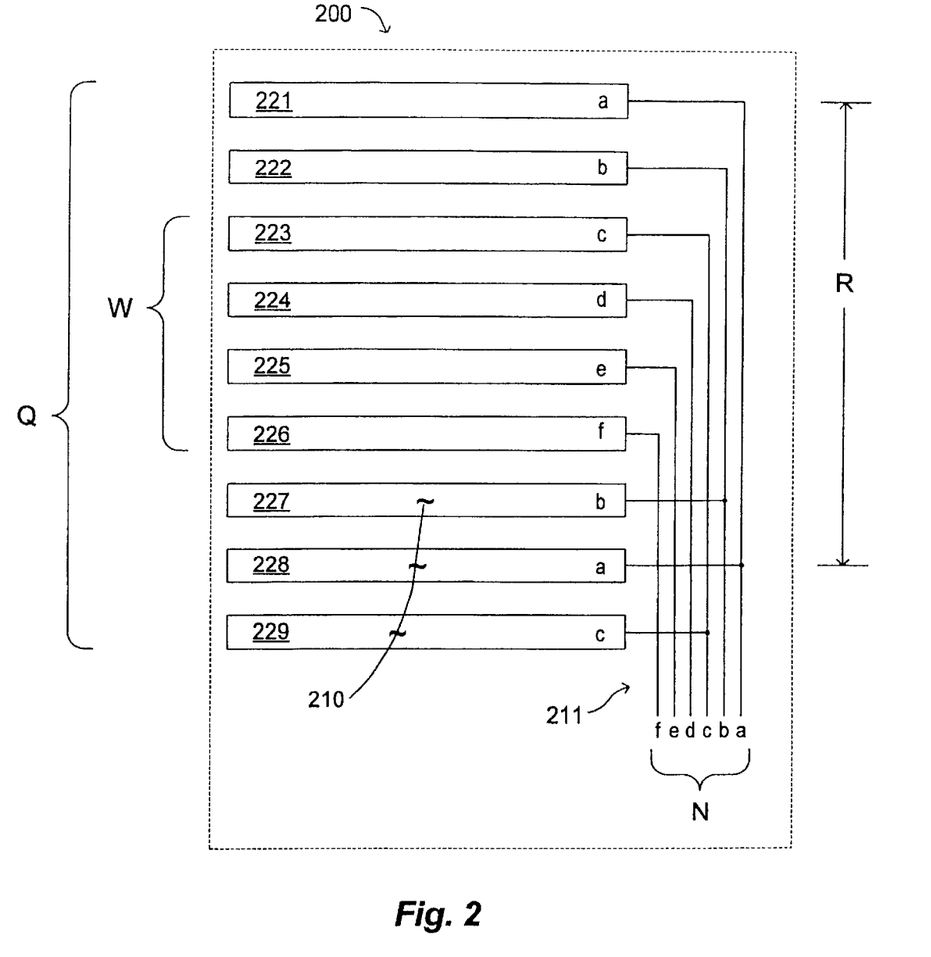
FIG. 2 is a schematic representation of an embodiment of a portion of a touch sensor in accordance with the invention.

FIG. 2 is a schematic representation of a portion of a simplified sensing circuit 200 illustrating principles of the invention. Shown in FIG. 2 are several conductive sensor bars 210 having one end connected to one of the lines 211. The several lines 211 may also be connected at the other end to an electronic control circuit or controller (not shown) that is configured to process the signals present on each of the lines 211. It should be appreciated that the bars 210 are shown only connected to lines 211 on one end in FIG. 2 for simplicity of illustration. In another embodiment, the other end of each bar 210 may also be connected to another line on the other side.

For ease of explanation, and referring to FIG. 2, the following terminology will be used:

"Q" is a total number of sensor bars 210 present in the sensing circuit 200. In this example, the bars 210 are individually numbered from 221–229.

"N" is a number of conductive lead lines 211 on one side of the screen, which is the same as the number of lines on the other side of the screen. Each of the bars 210 is connected to one of the lines 211 on each side of the bar 210. In this example, the lines 211 are individually labeled as a–f.

"W" is a window size (in terms of bar count) that defines how many neighbors, including the touched bar itself, are used to uniquely determine the touched bar location. In other words, the window size identifies how many bars 210 are analyzed when locating a contact. The window may be implemented as a software filter that examines a signal pattern generated by the strongest W signals on the lines to determine which window of bars corresponds to the signal pattern. For example, if the window size is 4, then the software filter may examine the 4 strongest signals on the lines to identify a signal pattern that corresponds with a particular window of 4 bars.

"R" is a range within which two bars 210 may not be connected to the same line 211. In other words, R defines a minimum distance between "brothers," or different sensor bars 210 that are connected to the same lead line 211.

The pitch and size of the bars 210 are selected such that a touch on any one bar 210 produces reasonable and sufficiently different signals on the bar's first and second nearest neighbors or further out, depending on the size of W. It should be recognized that no two bars 210 in any given window are connected to the same lead line 211.

Windows with Unique Membership

In accordance with the invention, rather than identifying which bar has experienced a touch based on a signal on a single line, the controller uniquely identifies which window has experienced the touch by analyzing the strongest signals on each of two or more lines, up to the window size W. The controller identifies the window by first identifying the lines having the W strongest signals. Thus, if the window size is 4, the controller identifies the lines carrying the 4 strongest signals. The relative signals on the W lines allows the controller to determine which window includes the bar that was touched because the line/bar connections within each window are arranged such that each window has unique membership. What follows is an explanation of unique membership and the methodology for arranging the line/bar connections within and among windows to allow them to be uniquely distinguishable, and hence, make their individual members uniquely distinguishable.

Referring to FIG. 2, where N=6 (i.e., there are 6 lines 211) and W=4 (i.e., the window size is 4), the bar/line connections are laid out such that each window has unique membership. Unique membership means that any given window includes a different set of bar/line connections than the other windows on the sensor. In other words, no window reuses the same set of lines as another window regardless of the particular arrangement of bar/line connections.

For example if 6 sense lines are labeled a, b, c, d, e, f (as in FIG. 2), then one can see the following (non-exhaustive) list of unique 4-bar combinations:

abcd
abce
abcf
bcde
bcdf
cdef
acde
acdf
and so on.

Note that no 4-bar combination above includes all of the same lines as any other 4-bar combination. Referring again to FIG. 2, the foregoing methodology can be clarified by specific example. Note that the bars are labeled by their line representations as follows: bar 221 is connected to line a, bar 222 is connected to line b, bar 223 is connected to line c, bar 224 is connected to line d, bar 225 is connected to line e, bar 226 is connected to line f, bar 227 is connected to line b, bar 228 is connected to line a, and bar 229 is connected to line c. More simply, the bars 210 are connected to the lines 211 in the following arrangement a, b, c, d, e, f, b, a, c. Given a window size of W=4, the following windows of bars (identified by their line representations) are created:

abcd
bcde
cdef
defb
efba
fbac

Note that no two windows share the same set of line representations regardless of the order. Each of these windows exhibits unique membership with respect to the other windows.

The above example includes nine bars 210 but only six lines 211. Using fewer lines N than bars Q has the desirable benefit of reducing conductor space on the periphery of the sensor and thus reducing the overall size of the sensor 200. However, a sufficient number of lines N should be used to satisfy the requirement that each window in a sensing circuit be uniquely distinguishable. As will be detailed later, a refinement to the invention allows the use of windows that do not have unique membership, but are still uniquely distinguishable.

An optional refinement to the design methodology, to balance the loading on the electronics, is to make the number of bars connected to each line the same. This would force the number of bars to be an integer multiple of the number of lines. For example, in the case of a sensor having N=7 and with 4 bars connected to each line (i.e., each line is used 4 times), the sensor should have a total of 28 bars.

As a further refinement to the invention, it may be desirable to keep brothers (or bars that share a line) reasonably spaced apart. If the spacing or Region between brothers is R, then the minimum R is W so that the same line cannot be connected to two bars in the same window. It may, however, be beneficial to have a minimum R somewhat larger than W to reduce the signal due to the modulation of the electric field due to far field loads on brothers of the touched bar. A balance in the sensor design could be achieved if the brothers to each bar are spaced apart on the sensor to the same degree as the brothers of any other bar. This could aid in a balanced representation of any "far field" load, thus reducing inaccuracies. An upper limit on R is not a strict requirement.

Windows with Non-Unique Membership

It should be apparent that with a given number of N signal lines and a given W, the number of possible combinations of unique membership limit the size of the touch sensor. If unique membership is strictly enforced, larger touch screens can only be realized by adding more signal lines (increasing N for a given W). To ameliorate such a need, a further refinement to the invention provides a touch sensor that utilizes windows that do not have unique membership, but which generate uniquely distinguishable signal patterns.

To understand this concept, it is important to recognize that a touch produces a peak signal on a given bar and a weaker signal on its neighbors by virtue of the distance from the touch. A graphical representation of these signals, when plotted in the same order as the bars, has a certain shape due to the strength of the signal falling off as a function of the distance from the touch. Two windows that do not have unique membership can be used if the signal patterns possibly created by the non-unique windows are mutually exclusive. In other words, the order of the particular line representations in two windows should be such that a touch on one bar in one window cannot create the same signal pattern as a touch in any other window.

Figure 3:
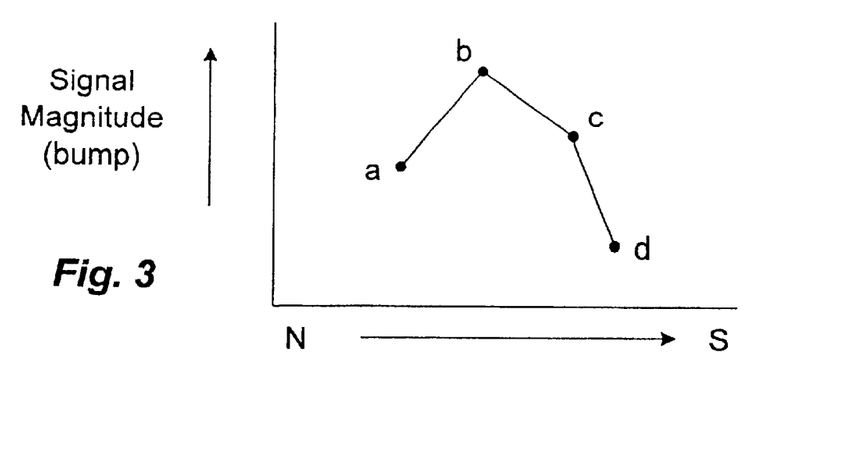
FIG. 3 is a schematic diagram showing a signal magnitude plot having a "bump" pattern demonstrated by a group of four sensor bars.

Referring to FIG. 3, the graphical representation of the signal strength or magnitude on each line in a typical window looks like a "bump" pattern since the outer most neighbors are the weakest and the touched bar between is the strongest. More specifically, as shown in FIG. 3, a touch occurred closest to a bar connected to line "b." The contact also created a weaker signal on the two neighbor bars to b, "a" and "c." Finally, the remaining bar in the window, "d," experienced the weakest signal. It will be appreciated that the signal pattern could deviate slightly from that shown in FIG. 3, but will generally have the "bump" appearance with signal magnitude decreasing from a bar having a strongest signal. For example, the bar connected to line c could have the strongest signal, followed by b, then a, then d. Many other combinations will also become readily apparent. Likewise, it is possible that two bars could share the same signal magnitude, such as if the touch occurred exactly between the two bars.

It should be understood that the edges of the sensor may present special boundary conditions due to the bars at the edges having no neighbors on one side, or due to any shunting effect a bezel may have on the edge bars. For instance, at the north and south ends (the uppermost and lowermost bars as shown in FIG. 2), the signal may be strongest at the bar on the edge of the screen (either bar 221 or bar 229 shown in FIG. 2) and decrease as a function of the distance away from the bar experiencing the touch. For example, the signal magnitude apparent on each bar in a window may give an ascending signal pattern (FIG. 4) or a descending signal pattern (FIG. 5) depending on whether the contact was experienced at the south end or the north end of the screen (respectively). Alternatively, one or more guard or sacrificial bars may be used at the edges of the screen to avoid these boundary conditions. For example, one or more bars may be used at the edges of the screen and be connected to a special line connected only to bars at the boundaries. A signal present on that line may be used in conjunction with signals on the other lines to uniquely identify a window at one of the edges of the touch screen, thereby obviating the boundary conditions.

Recognizing that real touches can only produce these types of signal patterns (bump, ascending, or descending patterns) enables windows having non-unique membership.

Figure 4:
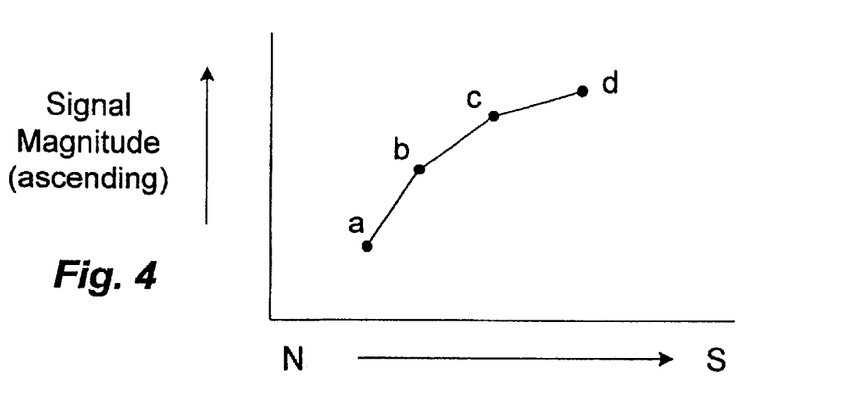
FIG. 4 is a schematic diagram showing a signal magnitude plot having an ascending pattern demonstrated by a group of four sensor bars.
Figure 5:
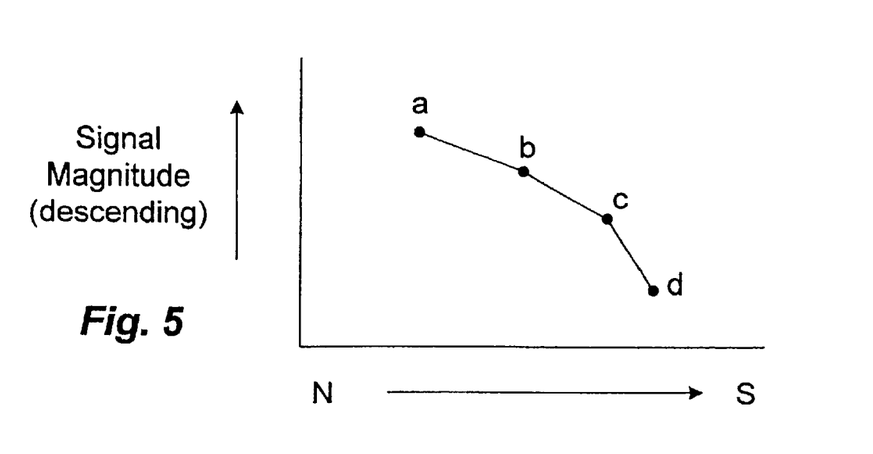
FIG. 5 is a schematic diagram showing a signal magnitude plot having a descending pattern demonstrated by a group of four sensor bars.

Since each realistic touch should result in a signal pattern similar to those illustrated in FIGS. 3–5, two or more windows can be connected to the same set of lines provided that the arrangement of the bar/line connections within each window results in mutually exclusive signal patterns, or signal patterns that are highly unlikely to occur in the real world. These combinations can be determined by examining the possible signal patterns generated by different arrangements of line representations within a window. When doing so, the designer may begin with a first arrangement of line representations within a window. Next the designer determines which other arrangements of windows must be excluded because they could possibly create an ambiguous signal pattern.

The following illustrates this design process. Assume that a sensing circuit, with a window size of W=4, is being designed. Assume throughout this explanation a realistic set of signal magnitudes A,B,C,D that are also the four strongest magnitudes and correspond to lines a,b,c,d respectively. For example, let B>C>A>D. Note that there are 4! arrangements of the lines a, b, c, and d (for a window size of 4). For example: abcd, abdc, acbd, etc. Of these arrangements, some result in patterns of signal magnitudes that are not possible for a real-world touch, given the assumed set of signal magnitudes. An example is the arrangement bdac. However, some of the arrangements result in patterns of signal magnitudes that are possible for a real-world touch. An example is the arrangement acbd. Based on that realization, to prevent ambiguity, the set of lines abcd must not be reused in other windows in arrangements that could also produce the same set of relative signal magnitudes arising from a real-world touch.

Figure 6:
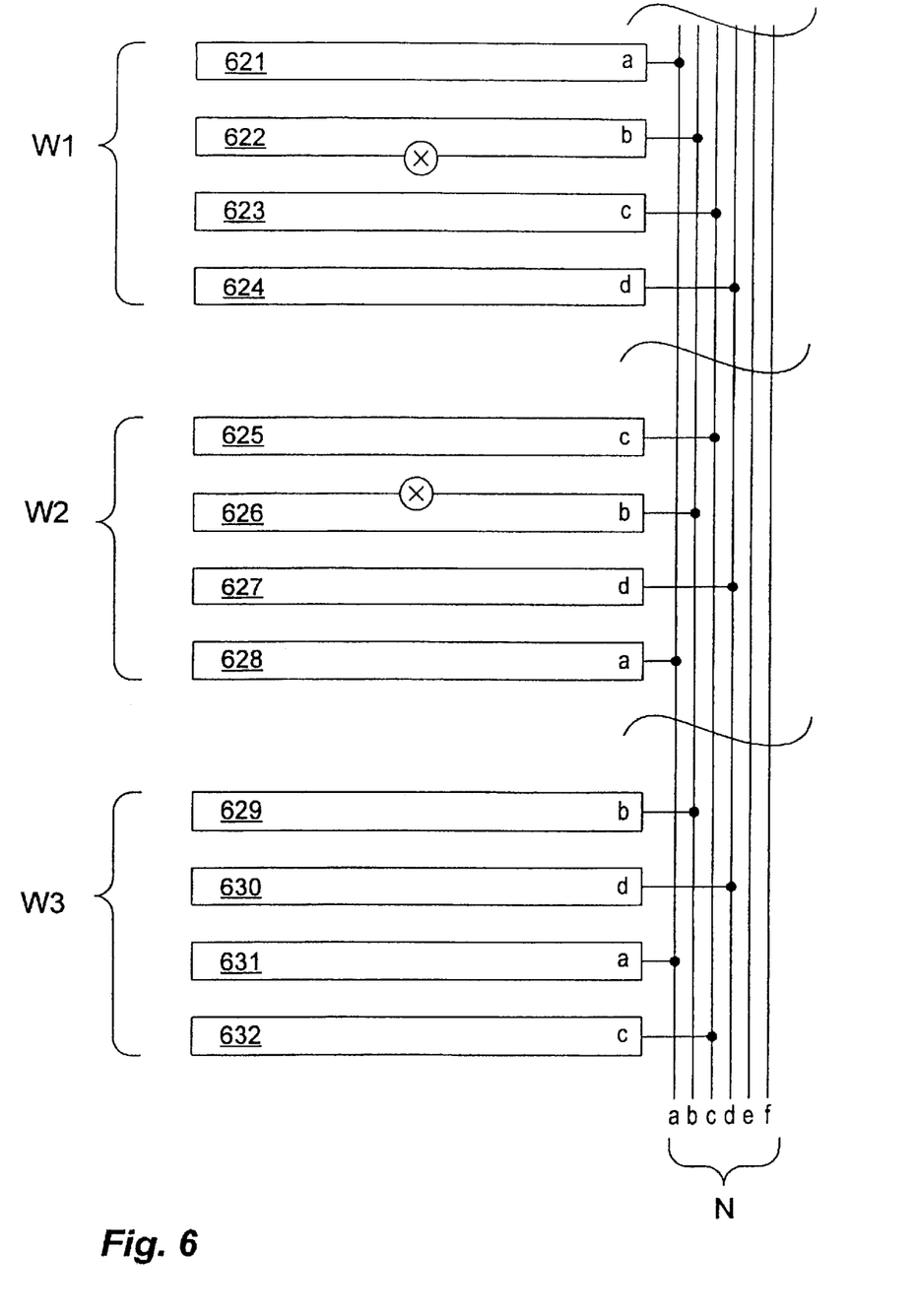
FIG. 6 is a schematic representation of another embodiment of a portion of a touch sensor to demonstrate another aspect of the invention.

For instance, referring to FIG. 6, three windows (W1, W2, W3) share the same lines (a, b, c, d), but in different arrangements. Window W1 includes bars 621, 622, 623, and 624 connected to lines a, b, c, and d respectively. Window W2 includes bars 625, 626, 627, and 628 connected to lines c, b, d, and a respectively. Finally, window W3 includes bars 629, 630, 631, and 632 connected to lines b, d, a, and c respectively. It should be apparent that the three windows W1, W2, W3 do not exhibit unique membership because all three share the same line representations, albeit in different arrangements. The circled Xs indicate touches within the windows.

Looking first at window W1, assuming the circled X indicates a touch, the order of relative signal strengths, in descending order, could be b>c>d>a, depending on how the user touched the screen (e.g., the user's hand could be near bars 623 and 624, but not touching). If a touch occurs within window W2 (at the circled X), it is possible to create the same relative signal strengths (i.e., b>c>d>a) if the user's hand is appropriately positioned near the screen. This would be a case where these two windows can possibly create the same signal pattern and thus are not uniquely distinguishable. For that reason, simultaneously using both window W1 and window W2 would be improper because the controller could not determine if the touched bar connected to line "b" was in window W1 or in window W2. However, if the entire set of possible permutations is examined this way, certain combinations can be found that will not be ambiguous. For instance, it is highly unlikely for a single touch that creates a bump signal pattern within window W3 to produce the same set of relative signal strengths as those created by a single touch within window W1 that also creates a bump signal pattern.

The inventors have determined that with a window size of W=4, and assuming that the combination abcd is present on the touch screen, there are at least 4 other arrangements of line representations that will not confuse the controller. For W=4, the alternative combinations that may still be used are cadb, cdab, bdac, and badc. It should be understood that it may not be possible to use more than a single alternative combination since the alternative combination itself must be distinguishable from all other windows also. In other words, although each of these four alternative combinations is distinguishable from abcd, they may not (and likely are not) distinguishable from each other or other windows on the screen.

Depending on how strictly the designer chooses to define a touch, it may be possible to realize more distinct arrangements. In addition, for different window sizes, other combinations will be possible. By using these extra combinations, more total bars Q can be included in a touch screen without increasing the total number of lines N.

Location Detection Methods

A portion of the invention may be implemented as algorithms embodied in a signal detection device, such as the controller discussed above, for identifying where on a touch screen a touch occurred.

Figure 7:
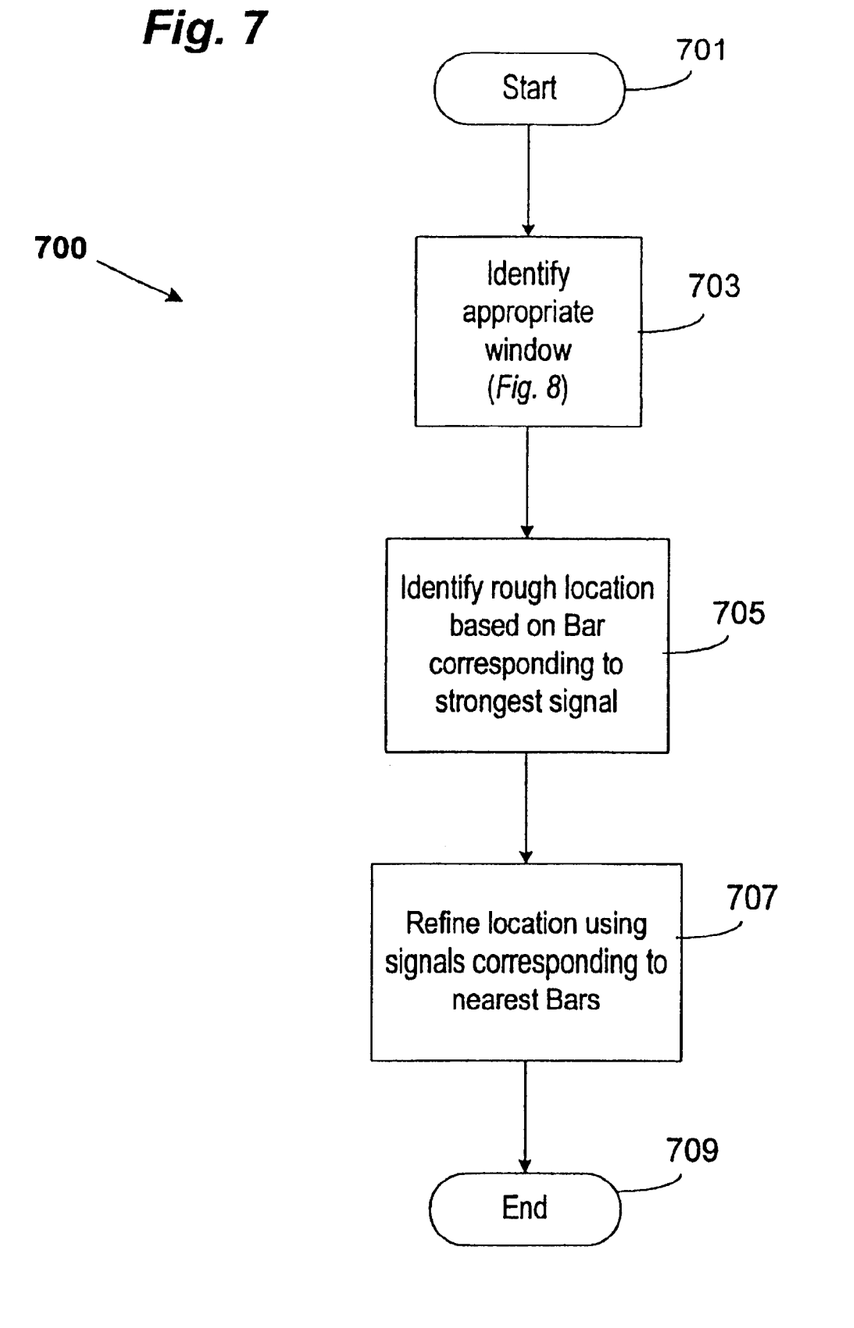
FIG. 7 is a logical flow diagram generally illustrating a process for determining a Y axis coordinate of a touch experienced on a touch screen.

FIG. 7 is a logical flow diagram generally illustrating a process that may be implemented in a controller for identifying where along the Y axis a touch occurs on a touch screen with a sensing circuit embodying the invention. The process 700 enters at a starting block 701 when the touch screen has experienced a touch. The process begins at block 703.

At block 703, in response to the touch, the process 700 identifies an appropriate window within which the touch has occurred. Briefly described here, and described in detail in conjunction with FIG. 8, the process 700 may analyze a number of strongest signals occurring as a result of the touch. The number of signals analyzed is based on a predetermined window size. For example, a window size of 4 means that the lines presenting the 4 strongest signals are analyzed to identify a window of 4 bars. In one embodiment, each window presents a signal pattern that is different from other windows, and analyzing the strongest signals identifies in which window the touch occurred.

At block 705, based on the analysis performed at block 703, the process 700 identifies a rough location of the touch. It will be appreciated that the rough location may be identified as the entire window identified at block 703 if that provides sufficient resolution for the particular application. However, in this embodiment, the rough location corresponds to the Y coordinate of the bar having the strongest signal within the previously identified window. For instance, if a particular set of signals resolves to a window "M," then the rough location of the touch is determined to be the Y coordinate of the bar within window M connected to the line having the strongest signal. In many implementations, this rough location may be adequate to identify the touch, and further resolution may not be necessary. For example, if the touch screen is used to present a push-button style user interface, then a rough location may be adequate to determine which of several "buttons" has been touched. Alternatively, finer resolution may be advantageous, in which case the process 700 includes an optional technique to provide that finer resolution.

At block 707, the process 700 optionally refines the rough location identified at block 705 using signals present on other lines corresponding to bars near (e.g., within the same window) the bar corresponding to the line having the strongest signal. Briefly stated, the Y coordinate of the touch may be refined from the rough location by interpolating between the bars presenting the strongest signals.

Figure 9:
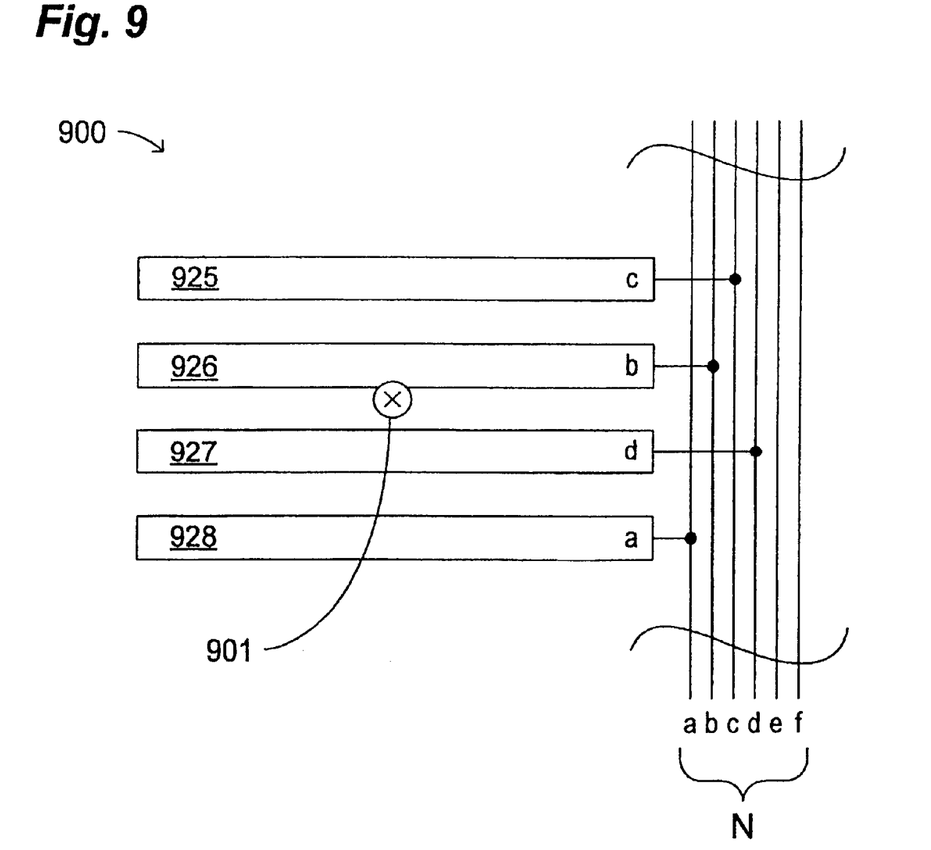
FIG. 9 is another schematic representation of a portion of a touch sensor to demonstrate yet another aspect of the invention.

For example, and referring briefly to FIG. 9, a touch 901 may be experienced on a touch screen and resolved to a particular window 900 as described above. Assuming that bar 926 (corresponding to line b) presents the strongest signal, the rough location may be established as the Y coordinate of that bar. A Y-axis correction may be calculated based on the relative signal strengths of the two nearest neighbors (e.g., bars 925 and 927) to the bar presenting the strongest signal (e.g., bar 926). That Y-axis correction may then be used to revise the rough location to improve the Y coordinate. For instance, if bar 927 (corresponding to line d) presents a signal stronger than bar 925 (corresponding to line c), the rough location may be refined to a Y coordinate nearer to bar 927 in proportion to the difference in strength between bars 925 and 927. In other words, if the signal strengths present on bar 925 and bar 927 were the same, the refined location could be the same as the rough location. However, the refined location would be nearer either bar that presented a stronger signal. Alternatively, if the relative strengths of all the bars in the window are used (e.g., including bar 928), the location may be refined further still.

Returning to FIG. 7, once the Y coordinate of the touch has been identified and, optionally, refined, the process 700 terminates at ending block 709. At this point, the Y coordinate of the touch to the touch screen embodying the present invention is known.

Figure 8:
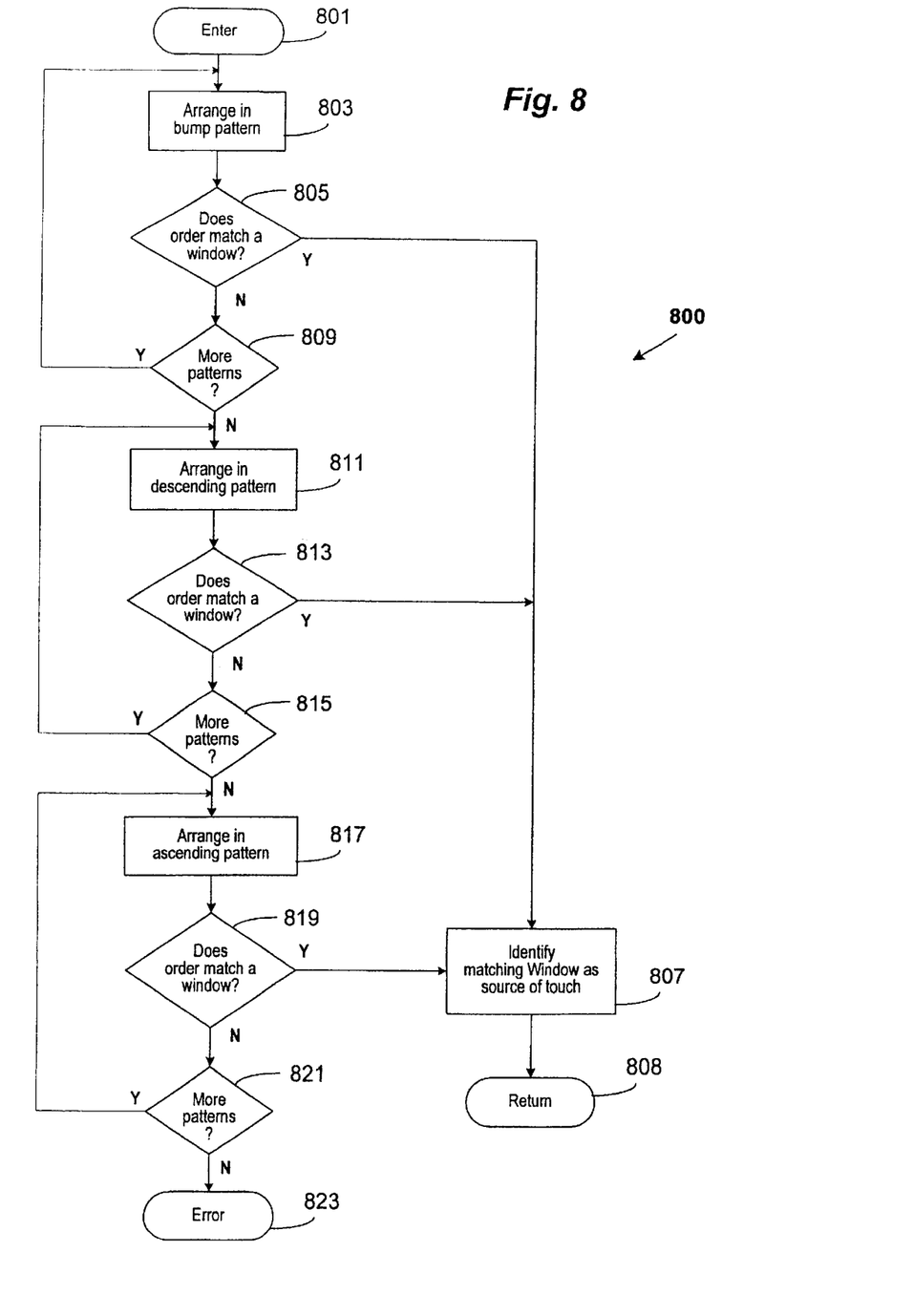
FIG. 8 is a logical flow diagram illustrating in greater detail one aspect of the process shown in FIG. 7 for identifying an appropriate window within which a touch has been experienced on a touch screen.

FIG. 8 is a logical flow diagram generally illustrating one particular embodiment of a process 800 for identifying an appropriate window within which a touch has been experienced on a touch screen implementing the present invention. The process 800 enters at block 801, when a touch has occurred on the touch screen. The touch is represented by signals occurring on a number of lines connected to the several bars of the touch screen. It is assumed that the W strongest signals on the lines arise from the bars within the window nearest the touch. Thus, in accordance with the invention, the process 800 analyzes the W strongest signals. Processing begins at block 803.

At block 803, the process 800 enters a loop to analyze the W strongest signals as a "bump pattern," as described above in conjunction with FIG. 3. More specifically, an initial arbitrary order, yet one forming a bump pattern, is assigned to the lines having the W strongest signals. Then at decision block 805, a determination is made whether the currently assigned order of the lines matches the line representations of an existing window. For example, referring again briefly to FIG. 9, assume that W=4 and it is determined that the 4 strongest signals are present on lines a, b, c, and d such that b>d>c>a. In that case, those lines may be assigned an arbitrary initial order (e.g., adbc) and that order is compared to the line representations of each window present in the touch screen. If a match is found, the process 800 proceeds to block 807 where the matching window is identified as the source of the touch and the process returns. Otherwise, the process 800 loops at block 809 to try another bump pattern order (e.g., abdc) for the lines until either a match is found or each bump pattern order has been tested. If no match is found, the process 800 exits the loop and proceeds to block 811.

At block 811, the process 800 enters a second loop to analyze the W strongest signals as a descending pattern, as described above in conjunction with FIG. 5, to determine whether they correspond to an existing window at the north end of the touch screen. More specifically, an initial order forming a descending pattern is assigned to the W strongest signals. At decision block 813, that initial order is compared to the line representations of the window at the north end of the touch screen. If a match is found, the process 800 proceeds to block 807 where the matching window is identified as the source of the touch. Otherwise, the process 800 loops at block 815 to try another descending pattern order for the lines until either a match is found or each descending pattern order has been tested, at which point the process 800 exits the loop and proceeds to block 817.

At block 817, the process 800 enters a third loop to analyze the W strongest signals as an ascending pattern, as described above in conjunction with FIG. 4, to determine whether they correspond to an existing window at the south end of the touch screen. More specifically, an initial order forming an ascending pattern is assigned to the W strongest signals. At decision block 819, that initial order is compared to the line representations of the window at the south end of the touch screen. If a match is found, the process 800 proceeds to block 807 where the matching window is identified as the source of the touch. Otherwise, the process 800 loops at block 821 to try another ascending pattern order for the lines until either a match is found or each ascending pattern order has been tested, at which point the process 800 exits the loop and proceeds to block 823, where an error is returned because no valid window was found. It should be noted that the order in which the loops are processed is unimportant to the functioning of the invention.

Finally, another process may be implemented in the controller to determine an X coordinate of the touch. Any acceptable algorithm may be implemented for determining the X coordinate, such as by assigning the X coordinate based on a comparison of the relative strengths of the signals presented on the lines connected to each side of a bar. For instance, the X coordinate may be determined by the implementing the following formula in software within the controller:

$$\frac{(\text{Maximum ``}X\text{'' Coordinate}) \times (\text{First Side Signal})}{(\text{First Side Signal} + \text{Second Side Signal})}$$

where the First Side Signal equates to a value related to the strongest W signals as sensed on the lines connected to one side of the touch screen, the Second Side Signal equates to a value related to the strongest W signals as sensed on the lines connected to the other side of the touch screen, and the Maximum X Coordinate essentially equates to the distance in the X direction substantially across the touch screen starting at the First Side. The First Side Signal and the Second Side Signal may be the values that result from the sum of the W strongest signals on the First Side or the Second Side, respectively. Alternatively, the First Side Signal and the Second Side Signal may be any other values equal to or derived from one or more of the signals on the respective sides. Those skilled in the art will appreciate that the above formula essentially calculates a weighting factor, which is the ratio of the First Side Signal to the total signal, and applies that weighting factor to the total distance across the touch screen to compute the X coordinate. Other techniques for calculating the X coordinate will become apparent to those skilled in the art.

The advantages of the present invention are many, as will be apparent to those skilled in the art. For example, the present invention enables a larger touch screen (based on sensor bar count) for a given number of lead lines. Stated differently, the present invention helps reduce the space required for routing lead lines (due to fewer lead lines) for a given touch screen size. In addition, a sensor circuit in accordance with the present invention, having symmetric sensor bar-to-lead line connections, results in balanced far field effects.

The foregoing description provides an enabling disclosure of the invention, which is not limited by the description but only by the scope of the appended claims. All those other aspects of the invention that will become apparent to a person of skill in the art, who has read the foregoing, are within the scope of the invention and of the following claims.

We claim:

1. A capacitive touch sensor comprising:
    a sensor array including a first plurality of lead lines and a series of sensor bars, the number of sensor bars in the series of sensor bars exceeding the number of lead lines in the first plurality of lead lines, the sensor bars each comprising a first end and a second end, the first end of each sensor bar being connected to one of the first plurality of lead lines, the series of sensor bars being further divided into windows of sensor bars with each window of sensor bars having a corresponding set of lead lines from the first plurality of lead lines, wherein each set of lead lines is distinguishable from each other set of lead lines such that each window of sensor bars is distinguishable from each other window of sensor bars, and wherein distinguishing one window of sensor bars from another window of sensor bars is based on identifying a set of signals present on an identified set of lead lines and comparing the identified set of lead lines to a listing of possible sets of lead lines to determine a matching set of lead lines, wherein the identified set of lead lines only has one possible matching set of lead lines in the listing of possible sets of lead lines.

2. The capacitive touch sensor of claim 1, wherein the first plurality of lead lines includes more leads lines than one set of lead lines corresponding to a window of sensor bars.

3. The capacitive touch sensor of claim 2, wherein each set of lead lines does not include all the same lead lines as any other set of lead lines.

4. The capacitive touch sensor of claim 2, wherein each set of lead lines does not include the same lead lines in the same arrangement as any other set of lead lines.

5. The capacitive touch sensor of claim 1, wherein a touch on the touch sensor creates the set of signals present on the identified set of lead lines, and the touch is located by identifying the window corresponding to the matching set of lead lines as the source of the touch.

6. The capacitive touch sensor of claim 1, wherein comparing the identified set of lead lines to the possible sets of lead lines includes comparing the arrangement of the identified set of lead lines to the arrangements of the possible sets of lead lines.

7. The capacitive touch sensor of claim 1, further comprising
a second plurality of lead lines equaling the number of the first plurality of lead lines so that each of the first plurality of lead lines has a corresponding lead line in the second plurality of lead lines, the second plurality of lead lines being connected to the second ends of the sensor bars so that each sensor bar is connected to one of the first plurality of lead lines and the corresponding one of the second plurality of lead lines.

8. A capacitive touch sensor comprising:
a sensor array comprising a plurality of lead lines and a series of sensor bars, the sensor array having a first side and a second side, the plurality of lead lines being divided equally between the first side and the second side, the series of sensor bars being further divided into windows of sensor bars with each of the windows of sensor bars having a corresponding set of lead lines from the plurality of lead lines, wherein a first set of lead lines is distinguishable from each other set of lead lines such that each window of sensor bars is distinguishable from each other window of sensor bars,
wherein the first set of lead lines is uniquely distinguishable from each other set of lead lines due to a signal pattern generated from a touch to the window of sensor bars corresponding to the first set of lead lines being distinguishable from another signal pattern generated by a touch to any other window of sensor bars.

9. A capacitive touch sensor comprising:
a sensor array comprising a plurality of lead lines and a series of sensor bars, the sensor array having a first side and a second side, the plurality of lead lines being divided equally between the first side and the second side, the series of sensor bars being further divided into windows of sensor bars with each of the windows of sensor bars having a corresponding set of lead lines from the plurality of lead lines, wherein a first set of lead lines is distinguishable from each other set of lead lines such that each window of sensor bars is distinguishable from each other window of sensor bars,
wherein the first set of lead lines does not include the same lead lines as any other set of lead lines.

10. A capacitive touch sensor comprising:
a sensor array comprising a plurality of lead lines and a series of sensor bars, the sensor array having a first side and a second side, the plurality of lead lines being divided equally between the first side and the second side, the series of sensor bars being further divided into windows of sensor bars with each of the windows of sensor bars having a corresponding set of lead lines from the plurality of lead lines, wherein a first set of lead lines is distinguishable from each other set of lead lines such that each window of sensor bars is distinguishable from each other window of sensor bars,
wherein the first set of lead lines includes the same lead lines as another set of lead lines but in a different arrangement.

11. A method for identifying a location of a touch on a sensor screen, comprising:
identifying a set of signals present on a set of lead lines connected to sensor bars on the sensor screen;
determining whether the set of lead lines corresponds to an existing window of sensor bars within a plurality of windows of sensor bars on the sensor screen, wherein each window of sensor bars has a corresponding set of lead lines; and
if the set of lead lines corresponds to an existing window of sensor bars, identifying the corresponding window as the location of the touch,
wherein determining whether the set of lead lines corresponds to an existing window comprises assigning an initial order to the set of lead lines and comparing the initial order to a listing of existing orders of existing sets of lead lines to identify a match.

12. The method of claim 11, further comprising:
if no match is identified with the initial order, iteratively reordering the set of lead lines and repeating the comparison with the new orders until the match is identified.

13. The method of claim 12, wherein if no match is found, indicating that an error has occurred.

14. The method of claim 11, wherein the existing orders of existing sets of lead lines are each distinguishable from one another.

15. The method of claim 11, wherein determining whether the set of lead lines corresponds to an existing window comprises determining if the set of signals present on the set of lead lines forms a bump pattern consistent with a bump pattern possible by a touch on the existing window.

16. The method of claim 11, wherein determining whether the set of lead lines corresponds to an existing window comprises determining if the set of signals present on the set of lead lines forms an ascending pattern consistent with an ascending pattern possible by a touch on the existing window.

17. The method of claim 11, wherein determining whether the set of lead lines corresponds to an existing window comprises determining if the set of signals present on the set of lead lines forms a descending pattern consistent with a descending pattern possible by a touch on the existing window.

* * * * *

UNITED STATES PATENT AND TRADEMARK OFFICE
CERTIFICATE OF CORRECTION

PATENT NO. : 6,825,833 B2
DATED : November 30, 2004
INVENTOR(S) : Mulligan, Roger C.

Page 1 of 1

It is certified that error appears in the above-identified patent and that said Letters Patent is hereby corrected as shown below:

Column 1,
Line 8, delete "1" before "Field of Invention"
Line 14, delete "2" before "Description of Related Art"

Column 4,
Line 35, delete "20" and insert -- 120 --, therefore

Column 9,
Line 35, delete "abed" and insert -- abcd --, therefore

Column 12,
Line 60, delete "leads" and insert -- lead --, therefore

Signed and Sealed this

Twenty-fourth Day of May, 2005

JON W. DUDAS
*Director of the United States Patent and Trademark Office*